Oct. 25, 1932.    H. F. PITCAIRN    1,884,847
AIRCRAFT
Original Filed Sept. 30, 1927

INVENTOR
Harold F. Pitcairn
BY
Synnestvedt & Lechner
ATTORNEYS

Patented Oct. 25, 1932

1,884,847

UNITED STATES PATENT OFFICE

HAROLD F. PITCAIRN, OF BRYN ATHYN, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT

Application filed September 30, 1927, Serial No. 223,017. Renewed February 28, 1931.

This invention relates to aircraft, and more particularly to aircraft of the helicopter type, especially such as are both propelled and sustained by one or more sets of rotating aerofoils.

Machines of this general type have been subject to various disadvantages and difficulties, particularly in their operation, among which are the following:

During translational movement of the aircraft the wing or wings moving in the general direction of movement of the machine exert a greater lifting force, due to the greater pressure of the air impinging thereon, than the wing or wings moving at the particular moment in the opposite direction. Similar changes in pressure and lift result from local gusts and eddies of the air itself. Such changes in pressure not only set up great stresses in the ordinary type of helicopter wing construction but also tend to throw the machine out of equilibrium. A more vital difficulty encountered is, that, when making a descent, with reduced power or with the engine or other driving mechanism shut off, particularly in the event of failure of the motive power, as a consequence of which the centrifugal force set up in the wings may be greatly reduced or disappear entirely, as the case may be, the wings are incapable of giving either the necessary support or the proper balance to the machine.

Figure 1:
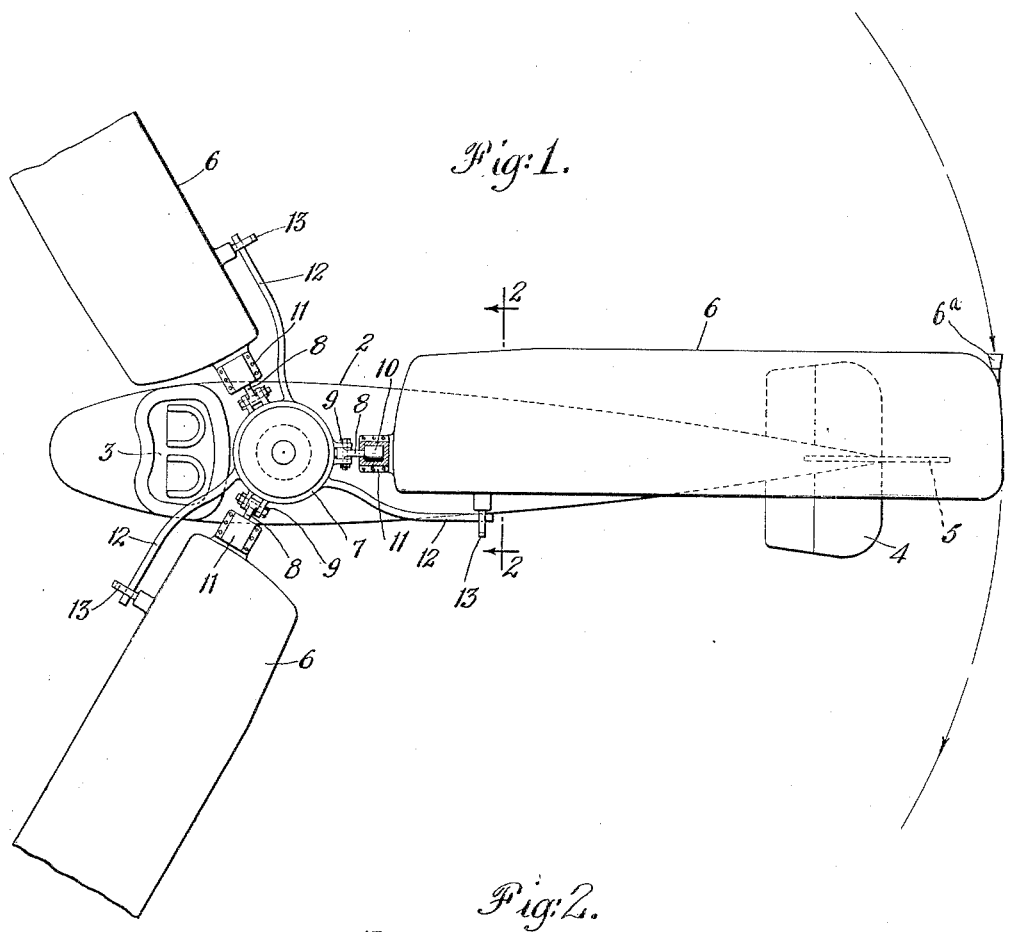
Figure 2:

I aim, by my invention, to obviate or minimize such difficulties and disadvantages, as well as others well known to those skilled in the art. How I attain the desired objects and advantages, together with such others as may be incident to the invention, will appear from the following specification, taken together with the accompanying drawing, in which:

Fig. 1 is a somewhat diagrammatic plan view of a helicopter embodying my invention, with certain parts broken away and others in section; and Fig. 2 is an enlarged sectional view on the line 2—2 of Fig. 1, taken thru the wing structure there shown.

The helicopter has a body or fuselage 2, with the usual cock pit 3, and horizontally and vertically disposed control surfaces 4 and 5, respectively.

While one or more propelling and sustaining units, each having any desired number of wings or aerofoils, may be used I have shown a single such unit having three blades or aerofoils 6, adapted to be rotatably driven either through their central hub member 7, or more preferably by means on the aerofoils themselves, such as compressed air, or other, jet-nozzles 6a. (See Fig. 1.) I do not here-in claim the jet driving mechanism, however, as the same is disclosed fully and claimed, in my co-pending application, Serial No. 231,858, filed Nov. 8, 1927.

Each wing member, for its mounting, has what might be termed a bearing piece or bearing member 8, which, at one end is pivotally secured, as at 9, to the hub, and at the other end is fitted into a bearing 10 in the stub 11 of the wing. It will thus be seen that each wing member has three movements, first, a rotational movement around the hub 7, second, a longitudinal swinging movement about the pivot 9, and third, a rocking movement at the bearing 10, the axis of which is lengthwise of the wing.

Secured to the hub are a plurality of rigid members or arms 12, each extending outward adjacent the leading, or "entering" edge of a wing. Each wing has secured thereto or mounted thereon, at the leading edge, a link-like lever means 13, which is slidably engaged by the arm 12.

In operation, it will be seen that this actuating structure 12, 13, alters the angle of incidence of the wing under the influence of and in accordance with alterations in the dihedral angle of the wing, that is, swinging of the wing on its pivot 9. Conversely, forces tending to shift the angle of incidence will also tend to alter the speed of rotation and change the dihedral angle, and such changes will take place to a greater or less extent according as the wing is rotating faster or slower and consequently influenced more or less, as the case may be, by the centrifugal force set up in it.

From the foregoing, it is obvious that, as the aerofoils rotate, they will maintain a substantially horizontal position under the influence of the centrifugal force.

It will further be seen that since each wing member is quite independent of the other members in two of its movements, that is the longitudinal movement and the rocking movement, that any changes in the lift of any particular aerofoil resulting from the advancing or retreating of the wings, with respect to the line of flight of the machine will be automatically compensated for independently.

In making a descent or forced landing because of power failure, the action of the air tends to swing the wings upward on their pivots 9, after the centrifugal force ceases to hold them out, which in turn thru the actuating means 12, 13 throws them into a negative angle of incidence. This causes, under the influence of the passing air current, a rotation of the wings in the direction of the arrow shown in Fig. 1, which is also the normal direction of rotation when under power, the aerofoils then acting in the nature of a parachute, the centrifugal force set up by their rotation holding them in a more or less extended position.

It is obvious that the device is rugged in construction, simple and automatic in action, and capable not only of causing the normal changes necessary in angle of incidence, but also of throwing the aerofoils into a negative angle automatically when making a forced descent, without the intervention of the human element.

What I claim is:—

1. An aircraft having a rotating aerofoil having transverse and longitudinal pivots, and rigid means rotating with said aerofoil and operatively associated therewith to shift the angle of incidence of the aerofoil by shifting it on its longitudinal pivot when it moves on its transverse pivot.

2. In an aircraft, the combination of a rotatable member, an aerofoil having a dual pivotal connection thereto, and means adapted to alter the angle of incidence of said aerofoil on one of its pivots as an axis automatically upon movement of the aerofoil on its other pivot.

3. In an aircraft, the combination of a rotatable member, an aerofoil having pivotal connection thereto, and means adapted to alter the angle of incidence of said aerofoil automatically upon movement of the latter on its pivot, said means being mounted to rotate with said aerofoil but being independent of its pivot.

4. In an aircraft, the combination of a rotating member, an aerofoil having pivotal connection thereto, and means adapted to alter the angle of incidence of said aerofoil upon movement of the latter on its pivot, said means including a jointed lever construction having a part thereof attached to the aerofoil and a part attached to the rotating member.

5. In an aircraft, the combination of a rotating member, an aerofoil having pivotal connection thereto, and means adapted to alter the angle of incidence of said aerofoil upon movement of the latter on its pivot, said means including a link mounted on said aerofoil and a member fixed to said rotating member and operating upon said link.

6. In an aircraft, the combination of a rotating member, an aerofoil having pivotal connection thereto, and means adapted to alter the angle of incidence of said aerofoil upon movement of the latter on its pivot, said means including a pair of members in sliding engagement one of which is mounted on said aerofoil and the other on said rotating member.

7. In apparatus of the character described, a propelling and sustaining unit comprising a hub and a plurality of wing members, a pivotal joint between each wing member and the hub, means permitting rocking of each wing around an axis substantially longitudinal thereof, lever means on each wing extending substantially transversely of said axis, and rigid actuating means secured to said hub and operatively associated with said lever means to rock said wing members about their longitudinal axes upon pivotal movement of said members.

8. In an aircraft, a plurality of aerofoils mounted for three separate movements with respect to said aircraft, i. e., rotational movement about a common center, longitudinal swinging movement about an axis substantially transverse to the axis of rotation, and rocking movement about an axis substantially transverse the other two axes, together with means automatically inter-relating said movements.

9. In an aircraft, a plurality of aerofoils mounted for three separate movements with respect to said aircraft, i. e., rotational movement about a common center, longitudinal swinging movement about an axis substantially transverse to the axis of rotation, and rocking movement about an axis substantially transverse the other two axes, together with means under the influence of said second movement of said aerofoils controlling said third movement thereof.

10. In an aircraft, a plurality of aerofoils mounted for three movements with respect to said aircraft, i. e., rotational movement about a common center, longitudinal swinging movement about an axis substantially transverse to the axis of rotation, and rocking movement about an axis substantially transverse the other two axes, together with means actuated upon swinging movement of said aerofoils and adapted to cause rocking movement thereof in accordance therewith.

11. In an aircraft, a plurality of aerofoils mounted for three movements with respect to said aircraft, i. e., rotational movement about a common hub center, longitudinal swinging movement about an axis substantially transverse to the axis of rotation, and rocking movement about an axis substantially transverse the other two axes, together with means rigidly secured to said hub and having operative connection to said aerofoils, said first mentioned movement of said aerofoils causing also the second mentioned movement subject to the influence of centrifugal force and air pressure, and said second mentioned movement of the aerofoils causing also said third movement thereof under the influence of the rigid means operatively associated therewith.

12. In an aircraft, the combination of a rotatable member, a wing blade having pivotal connection thereto for vertical swinging movement, and means adapted to alter the angle of incidence of said blade automatically upon pivotal movement of the latter, said means including a member, independent of said pivot means, mounted on said rotatable member and moving therewith.

13. In an aircraft, the combination of a rotatable member, a wing blade having pivotal connection thereto for vertical swinging movement, and means adapted to alter the angle of incidence of said blade automatically under influence of alteration of its speed of rotation, said means including a member, independent of said pivot means, mounted on said rotatable member and moving therewith.

14. In an aircraft, a sustaining rotor including a substantially vertically positioned axis member, wing means arranged for rotation therewith, mounting means securing the wing means to the axis member and pivoting them on the latter so that the wing means may unrestrainedly assume individual positions under the influence of air-reaction and inertia forces whereby variations in such forces are substantially balanced, and an individual rotatable connection securing each wing to its mounting means beyond the pivot means thereof for individual variation of pitch substantially about its longitudinal axis, together with power means for driving the wing means, and means automatically actuated under the influence of power cut-off to change the wing pitch.

15. In an aircraft, the combination of a revolubly-mounted member positioned to rotate about a substantially vertical axis, a plurality of aerofoils, each having means of pivotal connection to said member substantially independent of the others on an independent axis generally transverse the longitudinal axis of the aerofoil, each aerofoil having means permitting alteration of its own effective incidence, and individual incidence-changing mechanism for each aerofoil, connected thereto and spaced from the pivot means and operable under the influence of changes in lift automatically to alter the effective incidence of the aerofoil independent of the lift on, and pitch alterations of, the other aerofoils.

16. In an air screw, a hub, blades articulated thereto, a corresponding number of extensions from said hub for each blade, and means connecting each extension with its respective blade to cause the blade to attain a lower pitch when the blade rises above the normal plane of rotation and to attain a higher pitch when the blade falls below its normal plane of rotation.

In testimony whereof I have hereunto signed my name.

HAROLD F. PITCAIRN.